(12) United States Patent
Mizuno et al.

(10) Patent No.: US 7,618,708 B2
(45) Date of Patent: Nov. 17, 2009

(54) NANOPARTICLE ARRAY AND METHOD FOR PRODUCING NANOPARTICLE ARRAY AND MAGNETIC RECORDING MEDIUM

(75) Inventors: Mikihisa Mizuno, Miyagi (JP); Yuichi Sasaki, Miyagi (JP); Andrew Chak Chung Yu, Miyagi (JP); Makoto Inoue, Miyagi (JP); Migaku Takahashi, Miyagi (JP); Kazuyuki Tohji, Miyagi (JP); Jeyaderan Balachandran, Miyagi (JP)

(73) Assignee: Sony Corporation, Tokyo (JP)

( * ) Notice: Subject to any disclaimer, the term of this patent is extended or adjusted under 35 U.S.C. 154(b) by 357 days.

(21) Appl. No.: 10/926,868

(22) Filed: Aug. 26, 2004

(65) Prior Publication Data

US 2005/0079551 A1 Apr. 14, 2005

(30) Foreign Application Priority Data

Sep. 1, 2003 (JP) ............................ P2003-308754

(51) Int. Cl.
*B32B 5/16* (2006.01)
(52) U.S. Cl. ........................ 428/403; 428/327; 428/405
(58) Field of Classification Search ........................ None
See application file for complete search history.

(56) References Cited

U.S. PATENT DOCUMENTS

| 6,265,021 B1 * | 7/2001 | Black et al. ................. 427/131 |
| 7,067,194 B2 * | 6/2006 | Mao et al. .................... 428/429 |
| 7,220,482 B2 * | 5/2007 | Mino et al. .................. 428/403 |

FOREIGN PATENT DOCUMENTS

| JP | 04-273477 | 9/1992 |
| JP | 11-233752 | 8/1999 |
| JP | 2000-54012 | 2/2000 |
| JP | 2000-126861 | 5/2000 |
| JP | 2000-190300 | 7/2000 |
| JP | 2001-189014 | 7/2001 |
| JP | 2001-277200 | 10/2001 |
| JP | 2003-117900 | 4/2003 |
| JP | 2003-168606 | 6/2003 |
| WO | 01/81079 | 11/2001 |
| WO | 01/84238 | 11/2001 |
| WO | 02/05299 | 1/2002 |
| WO | 02-18288 A1 | 3/2002 |

OTHER PUBLICATIONS

Japanese Office Action issued on Jun. 19, 2007.

* cited by examiner

*Primary Examiner*—Holly Rickman
(74) *Attorney, Agent, or Firm*—Sonnenschein Nath & Rosenthal LLP (57) ABSTRACT

An organic layer capable of forming surface areas having an adsorption property different from that of a periphery due to the chemical change of a surface functional group is formed on a board. The surface of the organic layer is patterned and oxidized by a scanning probe microscope to form an array pattern in which small sections for adsorbing nanoparticles are arranged. Then, nanoparticle dispersed solution is applied to the organic layer having the array pattern or the organic layer is dipped in the nanoparticle dispersed solution to form a particle layer on the organic layer. At this time, the nanoparticles in the nanoparticle dispersed solution are respectively fixed only onto the small sections. Therefore, a nanoparticle array on which groups of nanoparticles are arranged in an array can be obtained. Thus, the nanoparticle array on which the groups of the nanoscale particles are arranged on the board is efficiently formed.

6 Claims, 7 Drawing Sheets

NANOPARTICLE ARRAY AND METHOD FOR PRODUCING NANOPARTICLE ARRAY AND MAGNETIC RECORDING MEDIUM

RELATED APPLICATION DATA

The present application claims priority to Japanese Application(s) No(s). P2003-308754 filed Sep. 1, 2003, which application(s) is/are incorporated herein by reference to the extent permitted by law.

BACKGROUND OF THE INVENTION

1. Field of the Invention

The present invention relates to a nanoparticle array in which groups of nanoscale particles are arranged in an array, a method for producing the nanoparticle array and a magnetic recording medium on which groups of magnetic nanoscale particles are arranged in an array.

This application claims priority of Japanese Patent Application No. 2003-308754, filed on Sep. 1, 2003, the entirety of which is incorporated by reference herein.

2. Description of the Related Art

As the compactness and the high integration of a semiconductor element and the high recording density of a recording medium have progressed, a nanoscale processing technique for producing the element has been required. For instance, in the field of the magnetic recording medium, patterned media in which a nanoscale magnetic material is arranged in the form of a lattice is proposed as a high density magnetic recording media in future (see for instance, a non-Patent Document 1; S. Y. Chou, M. S. Wei, P. R. Krauss, P. B. Fischer, J. Appl. Phys. 1994, 76, 6673.) and the nanoscale processing technique is important as a method for producing the patterned media.

It has been well-known that a photolithography technique usually employed for producing the semiconductor element hardly manufactures a structure smaller than 100 nm. An electron beam or focused ion beam lithography can achieve a nanofabrication such as several nm to several ten nm, however, it requires a high processing cost and takes a long processing time. Accordingly, these techniques are hardly put to practical use.

On the other hand, the use of a self-organization such as particles, block copolymers, anodic porous alumina, synthetic DNA, etc. is an efficient method for producing the patterned media (see for instance, non-Patent Documents 2 to 4 and Patent document 1; non-Patent Document 2; S. Sun, C. B. Murray, D. Weller, L. Folks, A. Moser, Science 2000, 287, 1989., non-Patent Document 3; K. Naito, H. Hieda, M. Sakurai, Y. Kamata, K. Asakawa, IEEE Trans. Mag. 2002, 38, 1949., non-Patent Document 4; M. Shiraki, Y. Wakui, T. Tokushima, N. Tsuya, IEEE Trans. Mag. 1985, 21, 1465., Patent Document 1; Japanese patent Application Laid-Open No. 2000-190300). However, in forming a pattern by the self-organization, the pattern is formed in random array directions at random positions on a board. Accordingly, the regularity of a structure is hardly strictly controlled to generate turbulence or defects in the arrangement of the nanoscale magnetic material. In the patterned media, the turbulence or the defects in the arrangement of the magnetic material undesirably cause an error during recording and reproducing data.

A nanoimprint method is a method for simultaneously transferring a pattern of a mold to a resist on a board by using the mold processed by an electron beam lithography and can achieve an efficient and regular nanofabrication can be realized (see for instance, non-Patent Document 5; S. Y. Chou, P. R. Krauss, P. J. Renstrom, Appl. Phys. Lett. 1995, 67, 3114.).

Also by this method, the patterned media can be efficiently formed. However, the patterned media in which the regularity of the mold pattern is precisely reproduced is hardly manufactured owing to a pattern transfer process by a mold press to the resist and a resist pattern transfer process to a magnetic layer by etching.

Methods for producing various kinds of patterned media are described in detail in non-Patent Document 6; C. A. Ross, Annu. Rev. Mater. Res. 2001, 31, 203.

As described above, the patterned media is proposed as a next generation high-density magnetic recording media. However, as the method for producing the patterned media, an efficient and accurate nanoscale processing technique has not been yet developed. Therefore, the patterned media in which groups of magnetic nanoparticles having a substantially uniform size are arranged in an array on a board and the efficient and regular nanofabrication method have been desired to be established.

Further, in recent years, various kinds of nanoscale particles have been developed as well as the magnetic nanoparticles. As such nanoparticles, for instance, semiconductor nanoparticles, conductive nanoparticles, ferroelectric nanoparticles, phase change nanoparticles, photochromic nanoparticles, thermochromic nanoparticles, electrochromic nanoparticles, etc. may be exemplified. For these nanoparticles, the technique for accurately arranging the groups of nanoparticles in an array on the board is applicable to a variety of uses.

SUMMARY OF THE INVENTION

The present invention is proposed by considering the above-described circumstances and it is an object of the present invention to provide an easily produced nanoparticle array in which groups of nanoscale particles are accurately arranged in an array on a board, a method for efficiently producing the nanoparticle array and a magnetic recording medium using the nanoparticle array.

Specifically, a nanoparticle array according to the present invention relates to a nanoparticle array comprising: an organic layer formed on a board and having a surface state in which small sections having a different adsorption property from that of a periphery due to a partial difference in molecular structure; and a particle layer having at least one or more nanoparticles arranged on each of the small sections on the organic layer.

Further, a method for producing a nanoparticle array according to the present invention comprises: a step of forming on a board an organic layer whose surface adsorption property is changed by oxidation; a step of patterning and oxidizing the surface of the organic layer so that small sections having an adsorption property are arranged; and a step of forming a particle layer having at least one or more nanoparticles on each of the small sections of the organic layer.

Further, a magnetic recording medium according to the present invention comprises: an organic layer formed on a board and having a surface state in which small sections having a different adsorption property from that of a periphery due to a partial difference in molecular structure; and a magnetic particle layer having at least one or more magnetic nanoparticles arranged on each of the small sections on the organic layer.

In the present invention, the organic layer whose surface physical or chemical adsorption property is changed due to the partial difference in molecular structure is formed on the board and a surface treatment for partly changing the molecu- lar structure of a corresponding part on the surface of the organic layer is carried out so that the small sections having the adsorption property are arranged in a prescribed pattern. Preferably, the organic layer is employed that a functional group on the surface of the organic layer is oxidized so that the physical or chemical adsorption property can appear or disappear. When the adsorption property appears by oxidation, parts corresponding to the small sections are oxidized. When the adsorption property disappears by oxidation, a surface patterning and oxidizing treatment for oxidizing parts except the small sections may be carried out. As the organic layer, a silane compound represented by a below-described general formula (1) may be employed.

(1)

(In the formula, X designates an alkyl group, a phenyl group, an amino group or any of derivatives of them, or the combination of them and A, B and C respectively designate an alkoxy group, a hydroxyl group, an alkyl group, a phenyl group or a halogen element.)

In the surface of the organic layer on which the surface treatment is performed, the small sections arranged in the prescribed pattern respectively have the adsorption property and parts except the small sections have no adsorption property. Thus, groups of nanoparticles introduced onto the organic layer are held and fixed only to the small sections. In such a way, the nanoparticle array in which the groups of the nanoparticles are arranged in the prescribed pattern on the board is obtained.

Further, when the adsorption force of each of the small sections of the organic layer is not sufficient relative to the nanoparticles, an adsorption layer composed of a silane compound represented by a below-described general formula (2) or an adsorption layer composed of polymer electrolyte selected from between polydiallyl dimethyl ammonium chloride, polyethyleneimine, polyvinylamine, polyallylamine, polyvinyl pyrrolidone, sodium polystyrene sulfonate and sodium polystyrene maleate is further provided on each of the small sections. Thus, the sufficient adsorption force to the nanoparticles can be assured.

(2)

(In the formula, Z represents —$NH_2$, —NH—$(CH_2)_x$—$NH_2$ (x=2 to 6), —NH—$(CH_2)_2$—NH—$(CH_2)_2$—$NH_2$, —NH—CO—$NH_2$, —NH—$(CH_2)_x$—$CH_3$ (x=0 to 3), —NH—CH—$(CH_3)_2$, —NH—$C_6H_5$, —NH—$(C_2H_4OH)$, —NH—$CH_2CH=CH_2$, —N—$(CH_3)_2$, —N—$(C_2H_5)_2$, —N—$(C_2H_4OH)_2$, —COOH, —OPO$(OH)_2$, —POOH, —$SO_2OH$ or —SOOH, A, B and C respectively designates an alkoxy group, a hydroxyl group, an alkyl group, a phenyl group or a halogen element, and l, m and n respectively represent integers located within a range of 0 to 17.)

In this case, the adsorption layers are respectively held and formed only on the small sections of the organic layer and the nanoparticles are adsorbed only on the adsorption layers.

Thus, the nanoparticle array in which the groups of the nanoparticles are arranged in the prescribed pattern is obtained.

The nanoparticle array according to the present invention can be formed as a high density magnetic recording medium of a next generation by using a magnetic material for the nanoparticles. In the magnetic recording medium of the present invention, the magnetic nanoparticles can use a magnetic material selected from among groups including elements; for instance, cobalt (Co), iron (Fe), nickel (Ni), manganese (Mn), samarium (Sm), neodymium (Nd), aluminum (Al), palladium (Pd), platinum (Pt), intermetallic compounds of the elements, binary alloys of the elements, ternary alloys of the elements, iron oxides further including at least one of the elements except iron (Fe), barium ferrite, and strontium ferrite.

When one recording bit is allocated to a group of magnetic nanoparticles fixed to one small section, the area of each of the small section is set to 6450 nm$^2$ or smaller. Thus, the area of the small section on which at least one or more magnetic nanoparticles are held can have a recording density of $1 \times 10^{11}$ bits/square inch (0.1 Tbit(terabit)/in$^2$) or higher. Further, the area of each of the small sections is set to 645 nm$^2$ or lower, so that the recording density of about $1 \times 10^{12}$ bits/square inch (1 Tbit/in$^2$) or higher can be achieved.

The nanoparticle array according to the present invention is produced via three steps including a step (a) of forming the organic layer on the board, a step (b) of forming a pattern in which the small sections having the adsorption property are arranged on the surface of the organic layer, and a step (c) of guiding and fixing the groups of the nanoparticles respectively on the small sections of the organic layer.

In the step (a), the organic layer is formed on the board by immersing the cleaned board in solution having the silane compound represented by the above-described general formula (1) dissolved for a prescribed time, or applying the solution to the board. The organic layer may be formed on the board by a Langmuir-Blodgett's technique.

In the step (b), the pattern having the small sections arranged on the surface of the organic layer is preferably formed by a surface patterning and oxidizing treatment. At this time, for instance, a scanning probe microscope having a conductive probe is used to scan the pattern on the organic layer and apply voltage to a part between the conductive probe and the surface of the organic layer. At this time, proper voltage, for instance, 0 V or higher and +50 V or lower is applied to the conductive probe, or −50 V or higher and 0 V or lower is applied to the board. Accordingly, many functional groups on the surface of the organic layer are electrochemically oxidized without deteriorating the structure of the organic layer. For instance, when the functional groups on the surface of the organic layer are methyl groups having no adsorption property, the functional groups are oxidized by carboxyl groups or the like having the adsorption property in areas corresponding to the small sections. Further, when the functional groups on the surface of the organic layer are amino groups having the adsorption property, the functional groups are oxidized by nitro groups or carbonyl groups having no adsorption property in areas except the small sections. The pattern of the small sections having the adsorption property is formed by such a surface patterning and oxidizing treatment.

Further, the surface patterning and oxidizing treatment may be carried out in such a way that a conductive stamp having a pattern formed by a lithography technique is disposed on the surface of the organic layer and the proper voltage of, for instance, 0 V or higher and +50 V or lower is applied to a part between the conductive stamp and the surface of the organic layer, or the proper voltage of −50 V or higher and 0 V or lower is applied to the board. According to this method, the parts on the surface of the organic layer that come into contact with the conductive stamp are electrochemically oxidized so that the array of the small sections is simultaneously formed.

Further, the surface patterning and oxidizing treatment may be carried out in such a way that a mask having a pattern formed by the lithography technique is disposed on the surface of the organic layer and the mask is irradiated with ultraviolet rays, oxygen plasma or corona. Thus, the exposed surface of the organic layer is oxidized so that the array of the small sections is simultaneously formed.

When the adsorption force of the small sections formed as described above is not sufficient for the nanoparticles, the pattern of the small sections is formed on the surface of the organic layer. Then, the board on which organic layer with the pattern of the small sections is formed is immersed in solution having a silane compound represented by the general formula (2) dissolved or solution having polymer electrolyte dissolved that is selected from between polydiallyl dimethyl ammonium chloride, polyethyleneimine, polyvinylamine, polyallylamine, polyvinyl pyrrolidone, sodium polystyrene sulfonate and sodium polystyrene maleate, or the solution is applied on the board having the organic layer. Thus, the adsorption layers composed of the silane compound or the polymer electrolyte are formed only on the small sections. Thus, a satisfactory adsorption force to the nanoparticles can be assured.

In the step (c), the board that is subjected to the surface patterning and oxidizing treatment is dipped in solution having the nanoparticles dispersed for a prescribed time or the solution is applied to the board. Thus, the functional groups on the surfaces of the small sections respectively adsorb the surfaces of the nanoparticles so that the groups of the nanoparticles are respectively fixed to the small sections. At this time, the groups of the nanoparticles are respectively fixed on the small sections as single particle layers. The board is dipped in the solution having the nanoparticles dispersed or the solution is applied to the board, so that the groups of the nanoparticles may be possibly respectively accumulated in several layers on the small sections. However, since the groups of the nanoparticles of the second layer or more are not fixed on the board, the board is cleaned with a solvent to wash away the groups of the nanoparticles of the second layer or more.

According to the present invention, the organic layer in which the adsorption property to the nanoparticles changes due to a partial difference in the molecular structure is provided on the board. The surface of the organic layer undergoes a patterning treatment so that the surface small sections having the adsorption property are formed in the form of the array. Thus, the groups of the nanoparticles can be guided and fixed only to the small sections and the nanoparticle array in which the groups of the nanoparticles are arranged on the board in the form of the array can be efficiently formed.

Further, according to the present invention, the magnetic nanoparticles are respectively fixed on the small sections of the organic layer, so that the magnetic recording medium in which the magnetic nanoparticles are arranged on the board in the form of the array can be efficiently manufactured.

DETAILED DESCRIPTION OF THE PREFERRED EMBODIMENTS

Now, an embodiment of the present invention will be described below by referring to the drawings.

Figure 1:
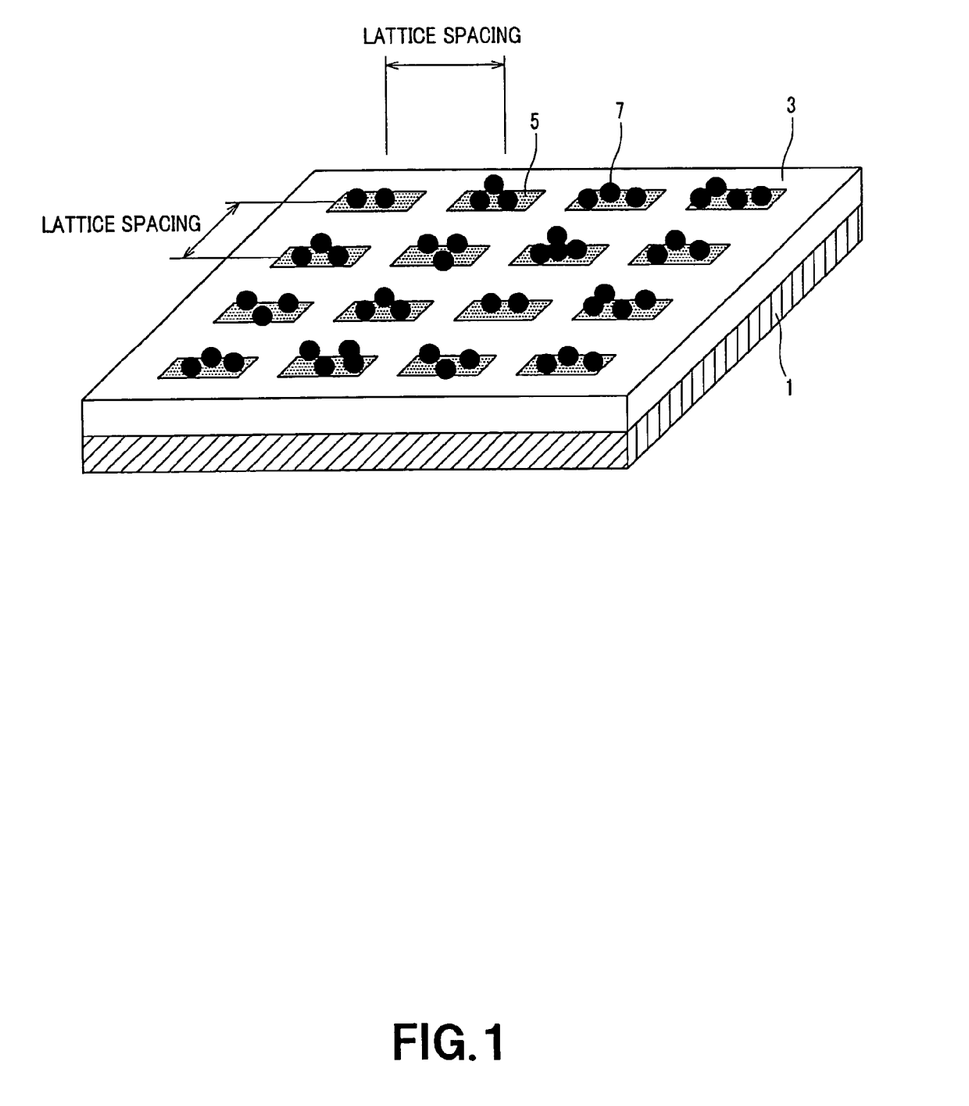
FIG. 1 is a schematic view showing one embodiment of a nanoparticle array of the present invention.

FIG. 1 shows one embodiment of a nanoparticle array according to the present invention. An organic layer 3 is formed on a board 1. The organic layer 3 undergoes a surface patterning and oxidizing treatment to form small sections 5 having an adsorption property which are arranged in an array and areas having no adsorption property outside the small sections except the small sections 5. Nanoparticles 7 are respectively fixed on the small sections 5. Here, the nanoparticle array of a magnetic recording medium using a magnetic material as the nanoparticles 7 will be described as an example.

For the board 1, any of well-known materials may be used. The form of the board 1 is not limited to a disc shape, a card shape, etc. For instance, hard boards such as silicon, $SiO_2$, MgO, etc. and soft boards such as polyimide, etc. may be exemplified.

For the organic layer 3 formed on the board 1, compounds are employed which are excellent in adhesive property to the board 1 and have adsorptive functional groups that physically or chemically adsorb the nanoparticles on the surface or functional groups capable of being changed to the adsorptive functional groups by oxidation. As such compounds, silane compounds represented by the below-described general formula (3) may be exemplified.

(3)

In the above-described formula (3), A, B and C respectively designate an alkoxy group, a hydroxyl group, an alkyl group, a phenyl group, or a halogen element. X designates an alkyl group, a phenyl group, an amino group or any of derivatives of them, or the combination of them. More specifically, X is represented by a below-described general formula (4).

(4)

In this case, Y designates $-CH_3$, $-CH=CH_2$, $-C(CH_3)=CH_2$, $-C_6H_6$, $-NH_2$, $-NH-(CH_2)_x-NH_2$ (x=2 to 6), $-NH-(CH_2)_2-NH-(CH_2)_2-NH_2$, $-NH-CO-NH_2$, —NH—(CH$_2$)$_y$—CH$_3$ (y=0 to 3), —NH—CH—(CH$_3$)$_2$, —NH—C$_6$H$_5$, —NH—(C$_2$H$_4$OH), —NH—CH$_2$—CH=CH$_2$, —N—(CH$_3$)$_2$, —N—(C$_2$H$_5$)$_2$, —N—(C$_2$H$_4$OH)$_2$, —COOH, —OPO(OH)$_2$, —POOH, —SO$_2$OH or —SOOH, and l, m and n respectively designate integers located within a range of 0 to 17.

Further, as the organic layer 3, nonpolar polymers such as polyacetylene, polyethylene, polypropylene, polystyrene, polybutadiene, polyisobutene, polymethyl methacrylate, and dendrimers having an end amino group such as polyamide amine dendrimer may be employed.

The surface of the organic layer 3 undergoes the surface patterning and oxidizing treatment so that the small sections 5 having the adsorptive functional groups are arranged in the form of an array. When the organic layer 3 is formed with the compound having the adsorptive functional groups, the adsorptive functional groups on the surface except the small sections are oxidized and changed to non-adsorptive functional groups, so that the form of the array is realized. Further, when the organic layer 3 is formed with the compound having the non-adsorptive functional groups capable of being changed to the adsorptive functional groups, the surfaces corresponding to the small sections 5 are oxidized and changed to the adsorptive functional groups. Thus, the form of the array is realized.

As the form of the array of the small sections 5 on the surface of the organic layer 3, any form having regularity such as a square lattice, a hexagonal lattice may be employed. The form of the array is suitably selected depending on the kind of a recording system.

When one recording bit is allocated to a group of magnetic nanoparticles fixed to one small section 5, the area of each of the small sections 5 is set to 6450 nm$^2$ or smaller. Thus, the area of the small section on which at least one or more magnetic nanoparticles are held can have a recording density of $1 \times 10^{11}$ bits/square inch (0.1 Tbit(terabit)/in$^2$) or higher. Further, the area of each of the small sections 5 is set to 645 nm$^2$ or lower, so that the recording density of about $1 \times 10^{12}$ bits/square inch (1 Tbit/in$^2$) or higher can be achieved. Accordingly, in the magnetic recording medium, the lattice spacing of the small sections 5, that is, the groups of the nanoparticles is preferably 80 nm or smaller.

The number of the nanoparticles 7 fixed on each of the small sections 5 is varied for each of the small sections 5 due to an error in a producing method. An allowable variation is determined depending on a magnetic recording and reproducing head that is used. When the variation is larger than a tolerance, the error is generated during recording and reproducing data. Thus, the variation needs to be located within the tolerance. The nanoparticles 7 on each of the small sections 5 may be arranged either regularly or at random.

As the nanoparticles 7, magnetic materials for the magnetic recording medium are used that are selected from among groups including elements; cobalt (Co), iron (Fe), nickel (Ni), manganese (Mn), samarium (Sm), neodymium (Nd), aluminum (Al), palladium (Pd), platinum (Pt), intermetallic compounds of the elements, binary alloys of the elements, ternary alloys of the elements, iron oxides further including at least one of the elements except iron (Fe), barium ferrite, and strontium ferrite.

The nanoparticles 7 are preferably formed by a solution phase synthesis. A solution phase synthesis method is a method that metallic salt, organic metal or the like is dissolved in liquid to deposit particles under a reducing or decomposing process. As well-known solution phase synthesis methods, a coprecipitation method, an alcohol reducing method, a thermal decomposition method of organic metal compound, a reversed micelle method, an ultrasonic wave method, etc. may be exemplified.

The nanoparticle formed by the solution phase synthesis method is obtained as dispersion solution having its surface coated with an organic stabilizer. The standard deviation of a particle diameter distribution is not higher than 20%, preferably not higher than 10%, and further preferably not higher than 5%. As the standard deviation of the particle diameter distribution decreases, the variation of the number of the nanoparticles fixed on each of the small sections 5 decreases so that the error upon recording and reproducing data can be more suppressed.

The organic stabilizer is a long chain organic compound represented by a general formula R—W. In the formula, R designates a long chain or a branch hydrocarbon chain including 6 to 22 carbon atoms or a long chain or a branch fluorocarbon chain including 6 to 22 carbon atoms. W designates carboxylic acid, phosphonic acid, phophinic acid, sulfonic acid, sulfinic acid, amine, and diamine.

When the nanoparticles 7 coated with the organic stabilizer are introduced to the surface of the organic layer 3 by dipping the board in the dispersion solution or applying the solution on the board, the organic stabilizer on the surfaces of the nanoparticles 7 are replaced by the adsorptive functional groups on the surfaces of the small sections 5 that physically or chemically adsorb the surfaces of the nanoparticles 7. Thus, the groups of the nanoparticles are respectively fixed on the small sections 5. The chemical adsorption includes a formation of a covalent bond. The physical adsorption includes a formation of an ionic bond, a coordinate bond, a hydrogen bond, an intermolecular bond, etc. except the covalent bond.

In the nanoparticle array formed as described above, an inorganic film layer can be further formed to further provide an abrasion resistance and a corrosion resistance as the magnetic recording medium. The inorganic film layer is formed with any of materials composed of a mixed phase including oxides, hydroxides and organic metals of zirconium, silicon, titanium, aluminum, or a combination of them. The thickness of the inorganic film layer is preferably not larger than 20 nm. When the thickness is not smaller than 20 nm, signal strength is extremely lowered to give a serious difficulty to S/N ratio.

As a method for forming the inorganic film layer, a method proposed in Japanese Patent Application Laid-Open No. 2003-13200 may be applied. For instance, metal alkoxide of zirconium, silicon, titanium, aluminum is used as a starting material, and the inorganic film layer including these metals can be formed by a sol-gel method by utilizing hydrolysis or dehydrative condensation processes in the solution. Further, sodium silicate solution such as sodium silicate solution is used as a starting material and silica (SiO$_2$) film may be deposited as the inorganic film layer under the dehydrative condensation processes in the solution.

However, when the inorganic film layer is formed in a liquid phase, the inorganic film layer does not grow on the surfaces of the nanoparticles made of a magnetic metal material which is not oxidized or the surface of the organic stabilizer with which the nanoparticles are coated. Thus, after silane coupling agent layers are formed on the groups of the nanoparticles so as to replace the organic stabilizer with which the nanoparticles 7 are coated thereby, the inorganic film layer is allowed to grow in the liquid phase. On the surfaces of the silane coupling agent layers, alkoxide groups or silanol groups are present. Accordingly, these alkoxide groups or silanol groups serve as starting points to generate a hydrolysis or a dehydrative condensation so that the inorganic film layers are allowed to grow.

The nanoparticle array according to this embodiment is produced via below-described three steps.

(a) The organic layer 3 is formed on the board 1.

(b) The surface of the formed organic layer 3 undergoes the surface patterning and oxidizing treatment so that the small sections 5 for physically or chemically adsorbing the nanoparticles are arranged in the form of an array on the surface.

(c) The board 1 subjected to the surface patterning and oxidizing treatment is immersed in the solution having the nanoparticles dispersed for a prescribed time or the solution is applied to the board 1 to guide and fix the groups of nanoparticles respectively on the small sections 5.

In the step (a), the organic layer 3 is formed on the board 1 in such a way that after the board 1 is cleaned by a wet cleaning such as an alkaline cleaning, an acid cleaning, a solvent cleaning, an RCA cleaning or the like, or a dry cleaning such as an irradiation with ultraviolet rays, an irradiation with ozone, an irradiation with oxygen plasma, etc., the board 1 is immersed in the solution having the silane compound as a material of which the organic layer 3 is made, nonpolar polymer or dendrimer dissolved for a prescribed time or the solution is applied to the board 1. The organic layer may be formed on the board 1 by the Langmuir-Blodgett's technique.

Figure 2:
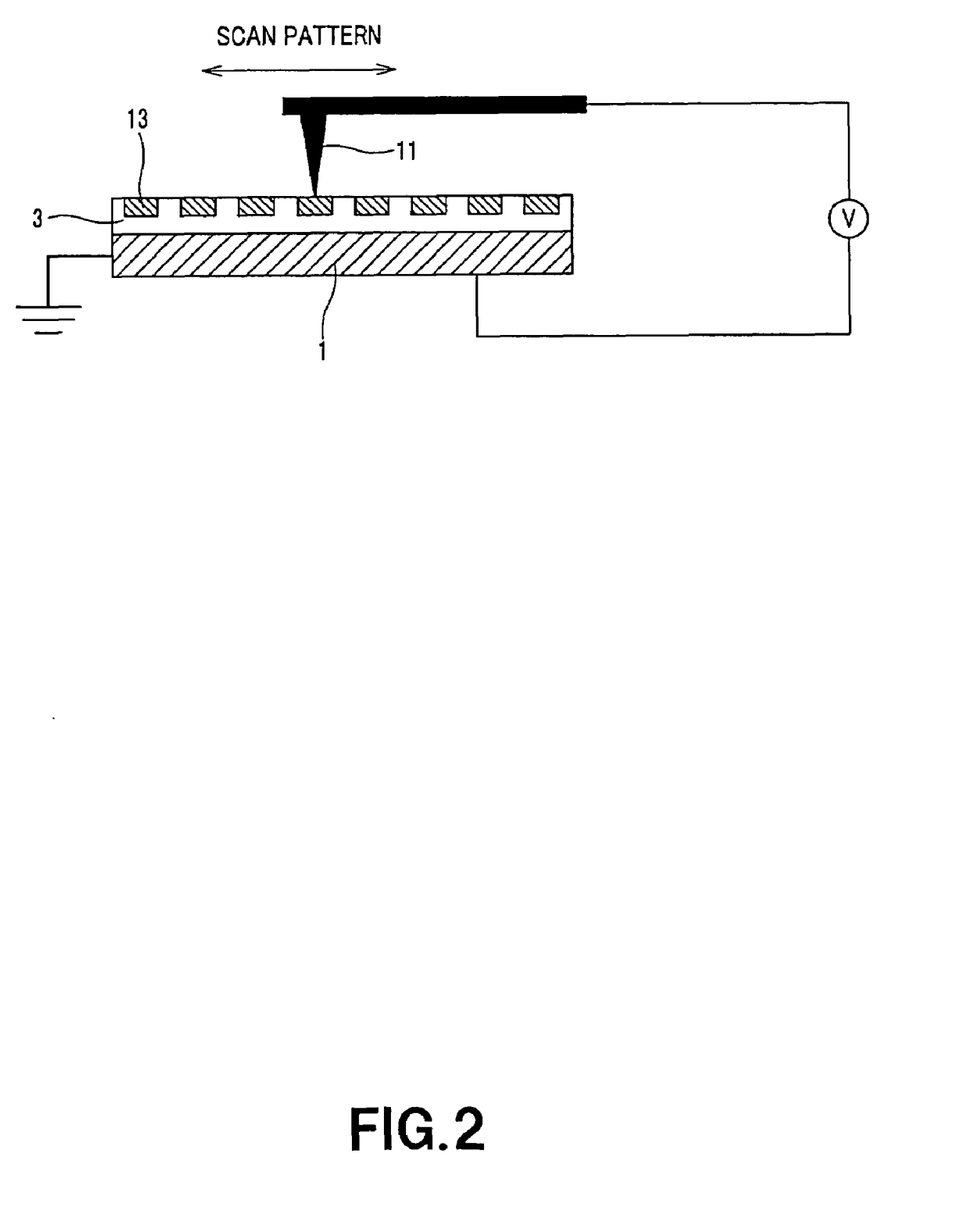
FIG. 2 is a schematic view showing a surface patterning and oxidizing treatment method using a scanning probe microscope having a conductive probe.

In the step of (b), the surface patterning and oxidizing treatment on the surface of the organic layer 3 is carried out by using, for instance, the scanning probe microscope. In this method, as shown in FIG. 2, the scanning probe microscope having the conductive probe 11 (a single probe or multi-probe array) is used to scan the pattern on the organic layer 3 and apply voltage to a part between the conductive probe 11 and the surface of the organic layer 3. A probe scanning is carried out in contact or tapping. At this time, proper voltage is applied (the voltage of 0 V or higher and +50 V or lower is applied to the conductive probe 11, or the voltage of −50 V or higher and 0 V or lower is applied to the board 1). Thus, the functional groups on the surface of the organic layer are electrochemically oxidized without damaging the organic structure in parts 13 to which the probe comes into contact and the voltage is applied, and the pattern of the adsorptive small sections is formed on the surface of the organic layer 3.

Figure 3A:
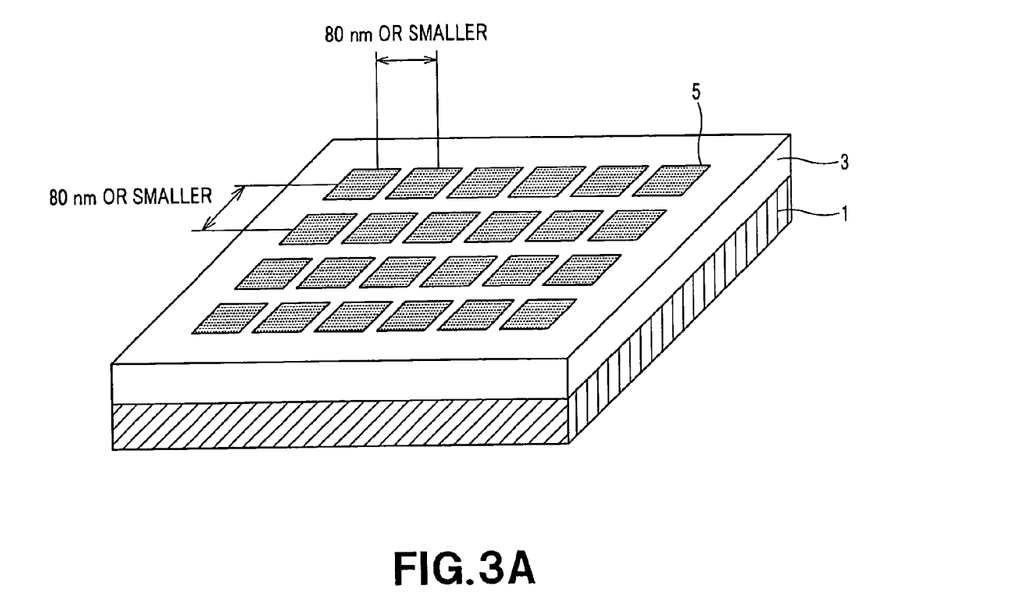
FIG. 3 is a schematic view showing a method for forming a small section array by the surface patterning and oxidizing treatment.
Figure 3B:
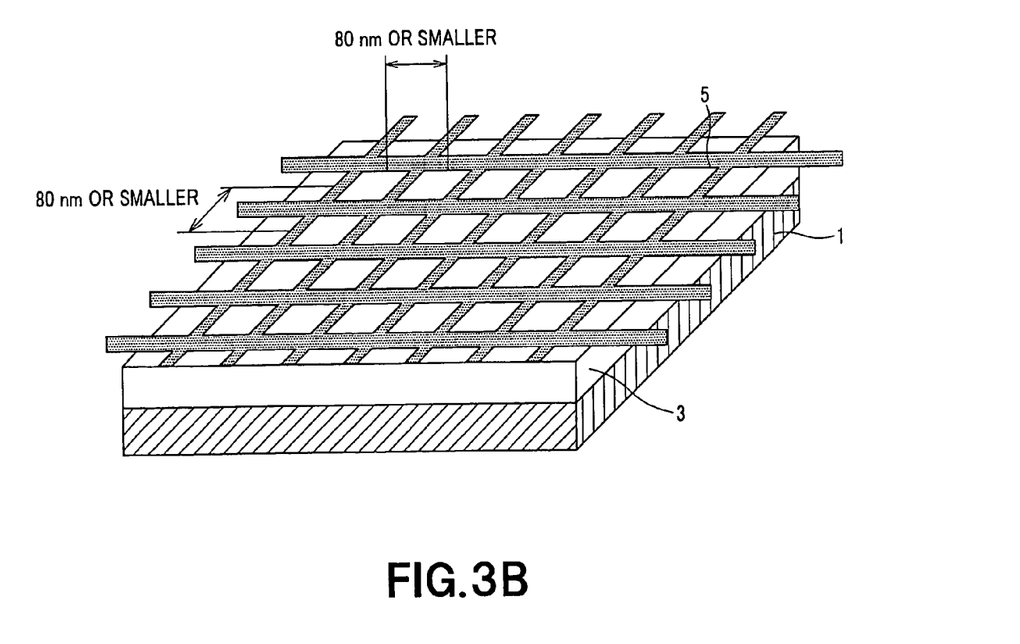

For instance, as shown in FIG. 3A, when the functional groups on the surface of the organic layer 3 are methyl groups which do not physically or chemically adsorb the nanoparticles, the methyl groups on the surfaces of areas corresponding to the small sections 5 are chemically changed to carboxyl groups that physically or chemically adsorb the nanoparticles under an electrochemical oxidizing process. Further, as shown in 3B, when the functional groups on the surface of the organic layer 3 are amino groups which physically or chemically adsorb the nanoparticles, the amino groups on the surfaces of areas except the small sections 5 are chemically changed to nitro groups or carbonyl groups that do not physically or chemically adsorb the nanoparticles under an electrochemical oxidizing process. Thus, the pattern of the small sections 5 that physically or chemically adsorb the nanoparticles is formed on the surface of the organic layer 3.

When the adsorption force of each of the small sections 5 thus formed is not sufficient relative to the nanoparticles 7, an adsorption layer composed of a silane compound represented by a below-described general formula (5) or an adsorption layer composed of polymer electrolyte selected from between polydiallyl dimethyl ammonium chloride, polyethyleneimine, polyvinylamine, polyallylamine, polyvinyl pyrrolidone, sodium polystyrene sulfonate and sodium polystyrene maleate is further provided on each of the small sections 5. Thus, the sufficient adsorption force to the nanoparticles 7 can be assured. As the adsorption layer, dendrimer having an end amino group such as polyamide amine dendrimer may be used.

(5)

(In the formula, Z represents —$NH_2$, —NH—$(CH_2)_x$—$NH_2$ (x=2 to 6), —NH—$(CH_2)_2$—NH—$(CH_2)_2$—$NH_2$, —NH—CO—$NH_2$, —NH—$(CH_2)_x$—$CH_3$ (x=0 to 3), —NH—CH—$(CH_3)_2$, —NH—$C_6H_5$, —NH—$(C_2H_4OH)$, —NH—$CH_2$—CH=$CH_2$, —N—$(CH_3)_2$, —N—$(C_2H_5)_2$, —N—$(C_2H_4OH)_2$, —COOH, —OPO(OH)$_2$, —POOH, —$SO_2OH$ or —SOOH, A, B and C respectively designates an alkoxy group, a hydroxyl group, an alkyl group, a phenyl group or a halogen element, and l, m and n respectively represent integers located within a range of 0 to 17.)

The adsorption layer is formed like the formation of the organic layer 3 by immersing the board in the solution or applying the solution to the organic layer 3. At this time, since the compound forming the adsorption layer is fixed only to each of the small sections 5 of the organic layer 3, the adsorption layer is selectively formed on each of the small sections 5. The adsorption force of the adsorption layer relative to the nanoparticles enables the groups of the nanoparticles to be arranged on the board 1 in accordance with the form of the array of the small sections 5.

Figure 4:
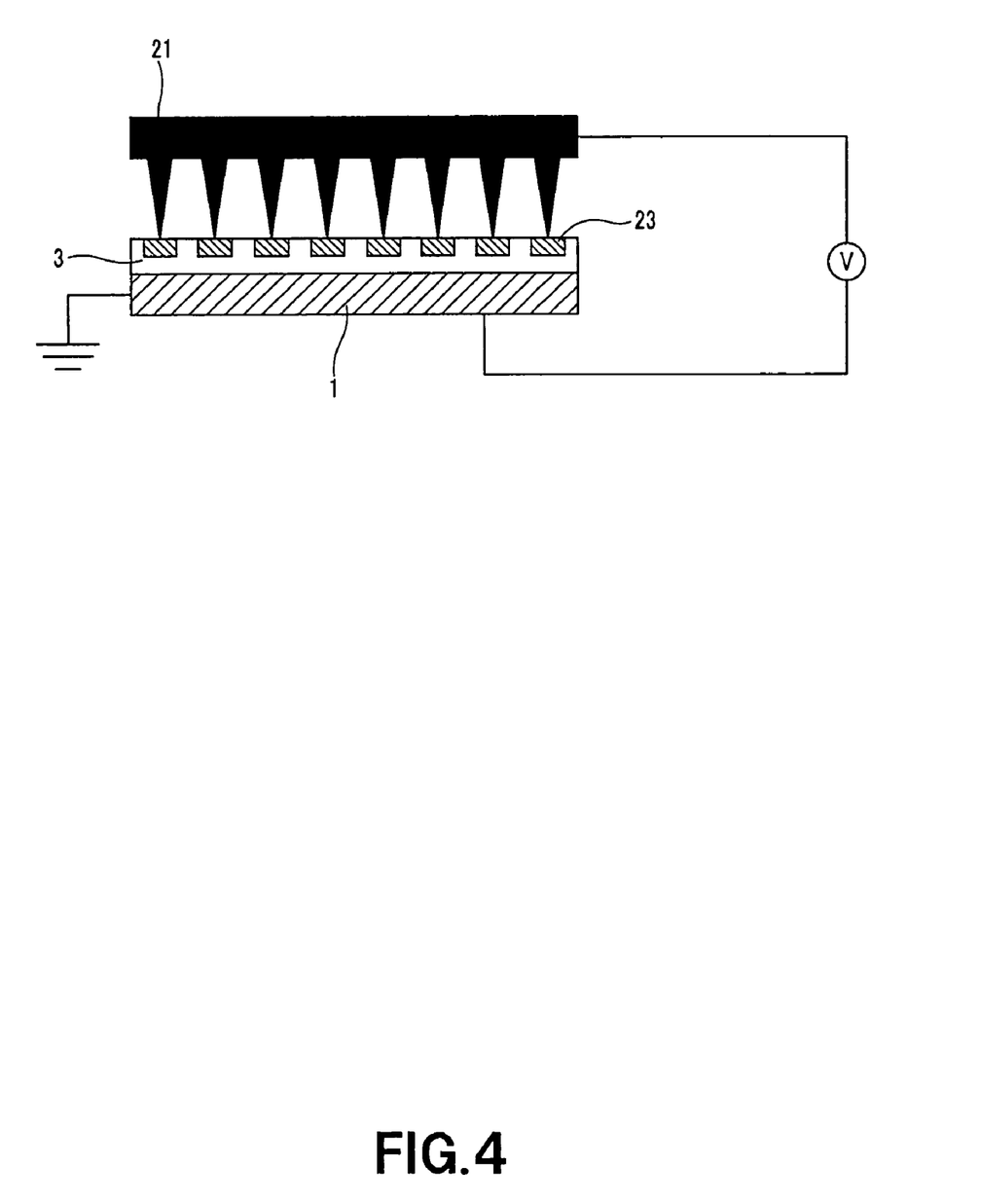
FIG. 4 is a schematic view showing the surface patterning and oxidizing treatment method using a conductive stamp having a pattern.

Further, the surface patterning and oxidizing treatment may be carried out, as shown in FIG. 4, in such a way that a conductive stamp 21 having a pattern formed by a lithography technique is disposed on the surface of the organic layer 3 and the proper voltage is applied to a part between the conductive stamp 21 and the surface of the organic layer 3 (for instance, the voltage of 0 V or higher and +50 V or lower is applied to the conductive stamp 21, or the voltage of −50 V or higher and 0 V or lower is applied to the board 1). According to this method, surfaces in the parts 23 on the surface of the organic layer that come into contact with the conductive stamp 21 are electrochemically oxidized so that the array of the small sections is simultaneously formed.

Figure 5:
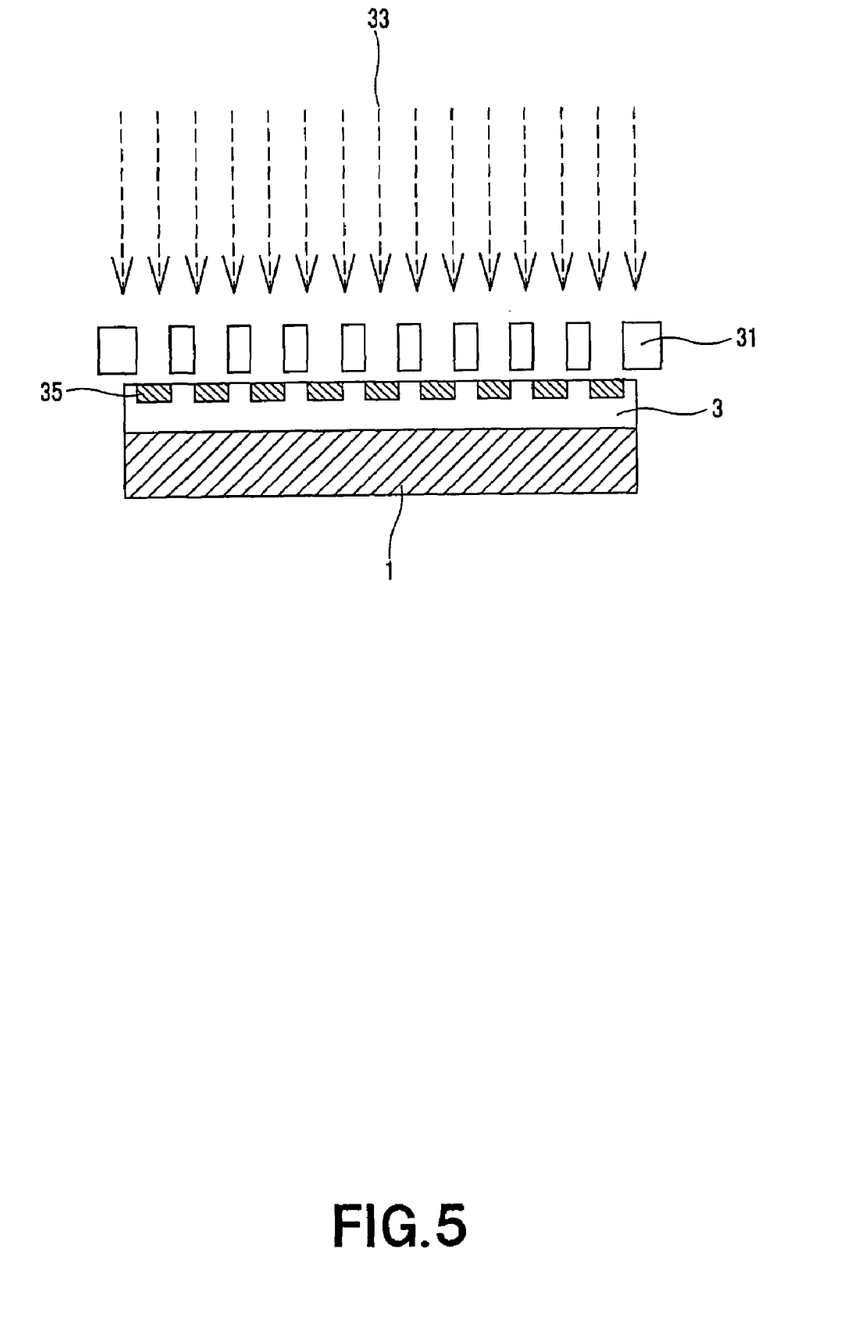
FIG. 5 is a schematic view showing the surface patterning and oxidizing treatment method for applying ultraviolet rays, oxygen plasma or corona through a mask.

Further, the surface patterning and oxidizing treatment of the organic layer 3 may be carried out, as shown in FIG. 5, in such a way that a mask 31 having a pattern formed by the lithography technique is disposed on the surface of the organic layer 3 and the mask is irradiated with ultraviolet rays, oxygen plasma or corona 33. Thus, the exposed surface 35 of the organic layer is oxidized so that the array of the small sections is simultaneously formed.

In the step (c), the board 1 is dipped in the solution having the nanoparticles dispersed for a prescribed time or the solution is applied to the board. Thus, the organic stabilizer on the surfaces of the nanoparticles 7 are replaced by the functional groups on the surfaces of the small sections 5 to adsorb the surfaces of the nanoparticles 7 so that the groups of the nanoparticles are respectively fixed to the small sections 5. At this time, the groups of the nanoparticles are respectively fixed on the small sections as single particle layers. The board 1 is dipped in the solution having the nanoparticles dispersed or the solution is applied to the board, so that the groups of the nanoparticles may be possibly respectively accumulated in several layers on the small sections. However, since the groups of the nanoparticles of the second layer or more are not fixed on the board 1, the board 1 is cleaned with a solvent to wash away the groups of the nanoparticles of the second layer or more.

When a multi-layered magnetic nanoparticle layer is formed, this may be achieved by applying a layer by layer method disclosed in N. A. Kotov, I. Dekany, J. H. Fendler, J. Phys. Chem. 1995, 99, 13065, or the like to the nanoparticle array manufactured in the step (c). The layer by layer method is a method for forming a multi-layer nanoparticle structure by alternating laminating anchor molecular layers for connecting the nanoparticle layer to the nanoparticles. According to this method, the thickness of the particle layer can be accurately controlled.

As apparent from the above description, according to this embodiment, the small sections for adsorbing the nanoparticles are provided on the surface of the organic layer formed on the board in the form of an array. The nanoparticles are stuck to the small sections, so that the groups of the nanoscale particles having the substantially uniform size can be arranged on the board in the form of an array. The array pattern of the small sections on the surface of the organic layer is formed by the surface patterning and oxidizing treatment using the scanning probe microscope having the conductive probe, the conductive stamp, or the mask. Thus, the accurate nanoparticle array can be efficiently and precisely formed.

Now, the present invention will be described in more detail by way of Examples.

EXAMPLES

Example 1

As a board, a p-type Si wafer was used. As a silane compound formed on the board, octadecyl trichlorosilane ($CH_3(CH_2)_{17}SiCl_3$, OTS) was used. As magnetic nanoparticle dispersed solution, FePt nanoparticle dispersed solution (average particle diameter: 4.4 nm, solvent: hexane, an organic stabilizer: oleylamine) synthesized by applying a method disclosed by Sun et al. Science, 2000, v. 287, p. 1989 was used.

Figure 6A:
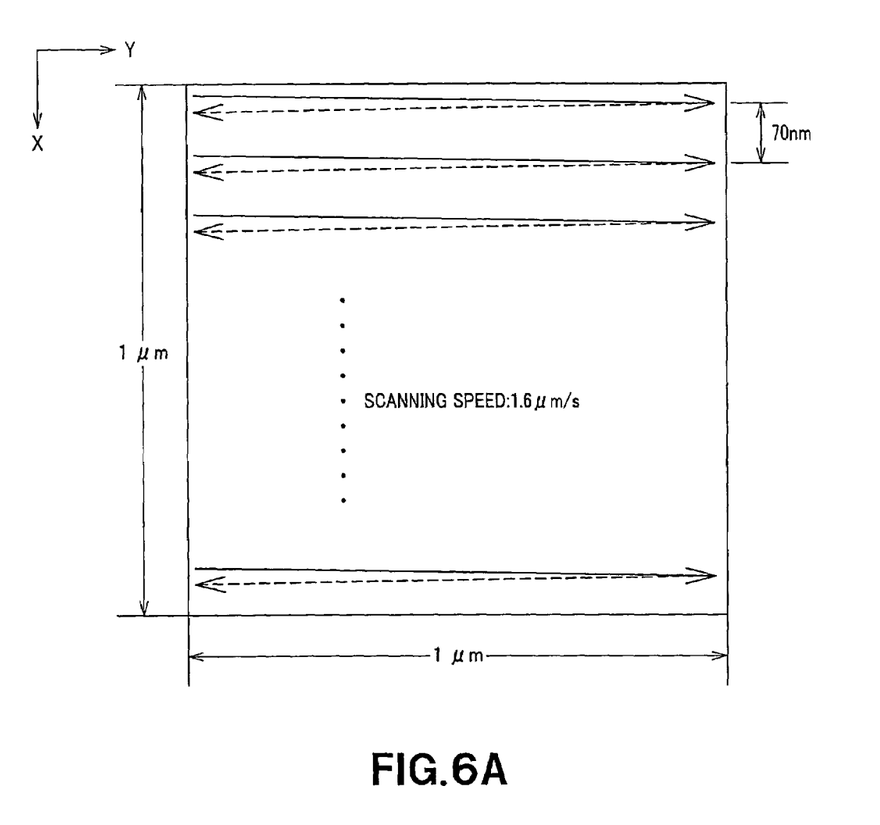
FIG. 6 is a diagram showing surface patterning and oxidizing treatment conditions using a scanning probe microscope in an Example 1.
Figure 6B:
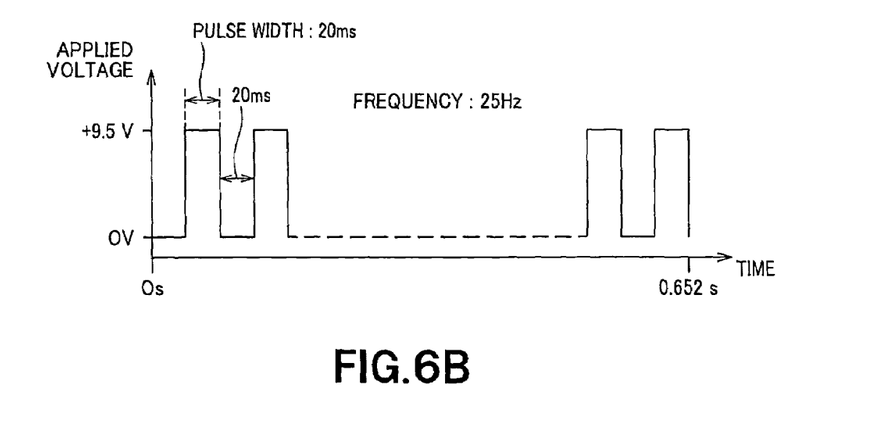

An OTS layer was formed on the board by immersing the board in toluene solution for a prescribed time. A surface patterning and oxidizing treatment was carried out in an atmospheric air by using a scanning probe microscope having a Pt coat probe (end radius of curvature: about 30 nm). As shown in FIG. 6A, the probe scanned at intervals of 70 nm in the direction of an X axis at scanning speed of 1.6 μm/s. As shown in FIG. 6B, when the probe moved in the direction of +Y axis, a positive voltage pulse (voltage: +9.5 V, pulse width: 20 ms, frequency: 25 Hz) was applied to the probe.

Figure 7A:
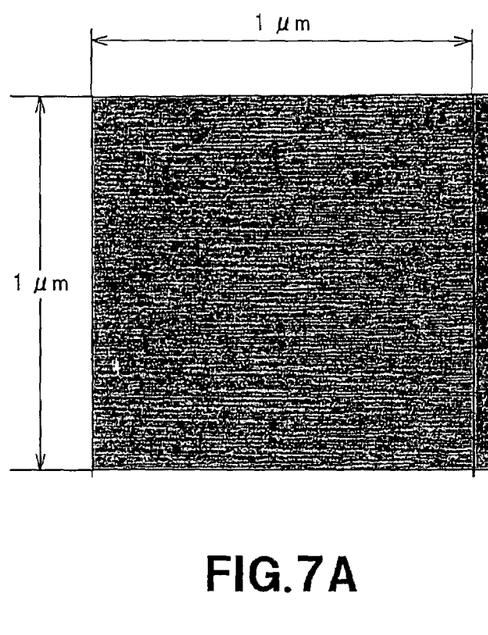
FIG. 7 is a view showing an AFM image (7A) and an LFM image (7B) on the surface of an organic layer after the surface patterning and oxidizing treatment in the Example 1.
Figure 7B:
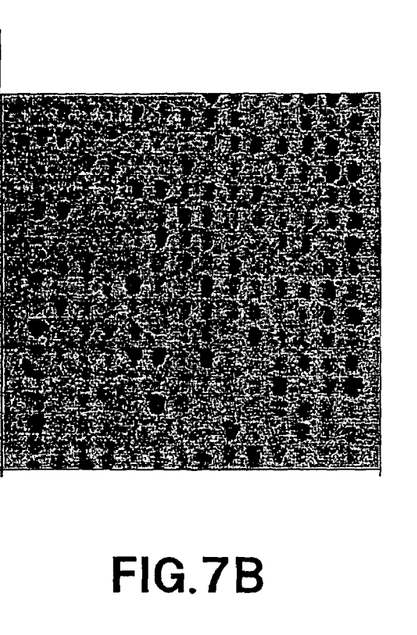

An AFM image (an atomic force microscope photograph) on the surface of an organic layer after the surface patterning and oxidizing treatment and an LFM image (a lateral force microscope photograph) are shown in FIG. 7. In the AFM image shown in FIG. 7A, the image is hardly changed from that before the surface patterning and oxidizing treatment. On the other hand, in the LFM image shown in FIG. 7B, a square lattice array (about 210 Gdots(giga dots)/in²) was formed in which square dots of a dot array (one side of about 35 nm) on a surface showing a frictional force higher than that of the surface of the OTS film were arranged at intervals of lattice of about 55 nm. That is, functional groups on the surface of the OTS layer could be reformed without damaging the OTS layer structure. As a result of an ESCA (an electron spectroscopy for chemical analysis) measurement, the change of the LFM image was caused due to a fact that $CH_3$ groups on the surface of the OTS layer chemically changed to OH groups by applying voltage.

As a comparative Example, when negative voltage was applied to the probe, the change in both the AFM image and the LFM image was not observed and such a pattern as described above could not be formed. Further, when voltage higher than +50 V was applied to the probe, the OTS film structure was broken in a part to which the voltage was applied to form a hole having a diameter of about several hundred nm.

Then, the board that was subjected to the surface patterning and oxidizing treatment was immersed in 3-minopropyl dimethyl ethoxysilane ($NH_2(CH_2)_3Si(CH_3)_2OC_2H_5$, APS) toluene solution for a prescribed time to selectively adsorb APS only to the surfaces of areas having OH groups to which voltage was applied. Thus, an array of small sections on which the APS layers having $NH_2$ groups were formed was formed on the surface of the OTS layer. Here, groups of magnetic nanoparticles were guided and fixed to the surface covered with the $NH_2$ groups and were not guided and fixed to the surface covered with $CH_3$ groups.

The board formed as described above was immersed in the FePt nanoparticle dispersed solution for a prescribed time. Thus, the groups of FePt nanoparticles were respectively fixed in single layers on the APS layers of small sections, so that a magnetic nanoparticle array could be manufactured.

Example 2

As a board, a p-type Si wafer was used. As a silane compound, an APS was used. As magnetic nanoparticle dispersed solution, FePt nanoparticle dispersed solution (average particle diameter: 4.4 nm, solvent: hexane, an organic stabilizer: oleylamine) synthesized by the same method as that of the Example 1 was used.

An APS layer was formed on the board by immersing the board in APS toluene solution for a prescribed time. A surface patterning and oxidizing treatment was carried out by using a scanning probe microscope having a Pt coat probe (end radius of curvature: about 30 nm). While a plurality of lines were traced on the surface of the APS layer, positive voltage of +9.25 V was applied to the probe. As a result of observing an AFM image and an LFM image on the surface of the organic layer after the surface patterning and oxidizing treatment, the AFM image hardly changed from that before the surface patterning and oxidizing treatment. On the other hand, in the LFM image, the formation of an array of small sections was recognized.

As a comparative Example, when negative voltage was applied to the probe, the change in both the AFM image and the LFM image was not observed and such a pattern as described above could not be formed. Further, when voltage higher than +50 V was applied to the probe, the APS film structure was broken in a part to which the voltage was applied to form a hole having a diameter of about several hundred nm.

In the surface patterning and oxidizing treatment on the surface of the APS layer having $NH_2$ groups, the $NH_2$ groups are oxidized in an area to which the voltage is applied through the probe. Thus, groups of magnetic nanoparticles are not physically or chemically adsorbed. On the other hand, an area to which the voltage is not applied physically or chemically adsorbs the groups of the magnetic nanoparticles by the $NH_2$ groups.

The board formed as described above was immersed in the FePt nanoparticle dispersed solution for a prescribed time. Thus, the groups of FePt nanoparticles were respectively fixed in single layers on small sections, so that a magnetic nanoparticle array could be manufactured.

Example 3

As a board, a thermally oxidized Si wafer (the thickness of an $SiO_2$ layer is 3000 Å) was used. As a silane compound, an OTS was used. As magnetic nanoparticle dispersed solution, FePt nanoparticle dispersed solution (average particle diameter: 3.1 nm, solvent: hexane, an organic stabilizer: oleylamine) synthesized by the same method as that of the Example 1 was used.

An OTS layer was formed on the board by immersing the board in OTS toluene solution for a prescribed time. A surface patterning and oxidizing treatment was carried out by irradiating the surface of the OTS layer with corona (space between electrodes: 1.5 cm, discharge output of 100 W, processing speed: 0.4 mm/sec). When the board that was irradiated with corona was immersed in the FePt nanoparticle dispersed solution for a prescribed time, groups of FePt nanoparticles were selectively fixed only to areas irradiated with corona in single layers. Thus, a magnetic nanoparticle array could be manufactured, because $CH_3$ groups on the surface of the OTS layer chemically changed to COOH groups or the like for adsorbing the magnetic nanoparticles by the irradiation of corona.

The nanoparticle array may be applied to a wide range of uses such as wiring, sensors, memories, etc. as well as the magnetic recording medium by using non-magnetic nanoparticles such as semiconductor nanoparticles, conductive nanoparticles, ferroelectric nanoparticles, phase change nanoparticles, photochromic nanoparticles, thermochromic nanoparticles, electrochromic nanoparticles, etc.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

What is claimed is:

1. A nanoparticle array comprising:
   a board;
   an organic layer formed on the board and having a plurality of distinct sections within a periphery of the board, the sections having surfaces with an adsorption property different from that of the periphery due to a partial difference in their respective molecular structures resulting from surfase patterning and oxidation; and
   a particle layer having at least one or more nanoparticles having surfaces coated with an organic stabilizer by the solution phase synthesis method and accurately arranged on each of the distinct sections of the organic layer, the distinct sections of the organic layer having an adsorption property so that the nanoparticles are adsorbed onto the distinct sections via a physical or chemical bond,
   wherein,
   an adsorption layer for adsorbing the nanoparticles is provided between each of the distinct sections of the organic layer and the particle layer.

2. The nanoparticle array according to claim 1,
   wherein,
   the distinct sections of the organic layer have an adsorption property to a material of which the adsorption layer is made.

3. The nanoparticle array according to claim 1,
   wherein,
   the adsorption layer is formed with a silane compound represented by a below-described general formula (7) or polymer electrolyte selected from between polydiallyl dimethyl ammonium chloride, polyethyleneimine, polyvinylamine, polyallylamine, polyvinyl pyrrolidone, sodium polystyrene sulfonate, and sodium polystyrene maleate:

(7)

(In the formula, Z represents —$NH_2$, —NH—$(CH_2)_x$—$NH_2$ (x=2 to 6), —NH—$(CH_2)_2$—NH—$(CH_2)_2$—$NH_2$, —NH—CO—$NH_2$, —NH—$(CH_2)_x$—$CH_3$ (x=0 to 3), —NH—CH—$(CH_3)_2$, —NH—$C_6H_5$, —NH—$(C_2H_4OH)$, —NH—$CH_2$—CH=$CH_2$, —N—$(CH_3)_2$, —N—$(C_2H_5)_2$, —N—$(C_2H_4OH)_2$, —COOH, —OPO$(OH)_2$, —POOH, —$SO_2OH$ or —SOOH, A, B and C respectively designates an alkoxy group, a hydroxyl group, an alkyl group, a phenyl group or a halogen element, and l, m and n respectively represent integers located within a range of 0 to 17).

4. The nanoparticle array according to claim 1,
   wherein, the nanoparticles are nanoscale particles having a diameter of 100 nm or smaller.

5. The nanoparticle array according to claim 1,
   wherein,
   the adsorption property of the distinct sections of the organic layer is effective to adsorb the nanoparticles.

6. The nanoparticle array according to claim 1,
   wherein,
   the organic layer is formed with a silane compound represented by a below-described general formula (6)

(6)

(In the formula, X designates an alkyl group, a phenyl group, an amino group or any of derivatives of them, or the combination of them, and A, B and C respectively designate an lkoxy group, a hydroxyl group, an alkyl group, a phenyl group, or a halogen element.)

* * * * *